Aug. 25, 1953            F. X. LAMB            2,650,349
ELECTRICAL INSTRUMENT WITH PERMANENT MAGNET CORE
Filed Aug. 11, 1949
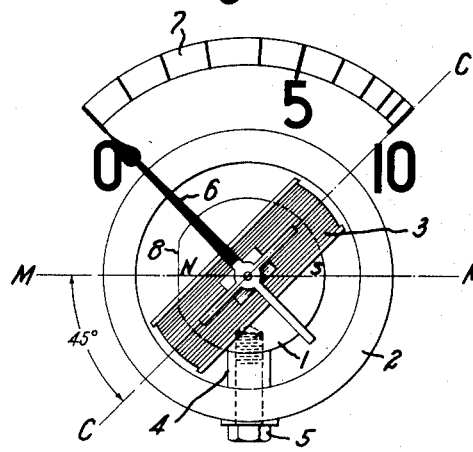
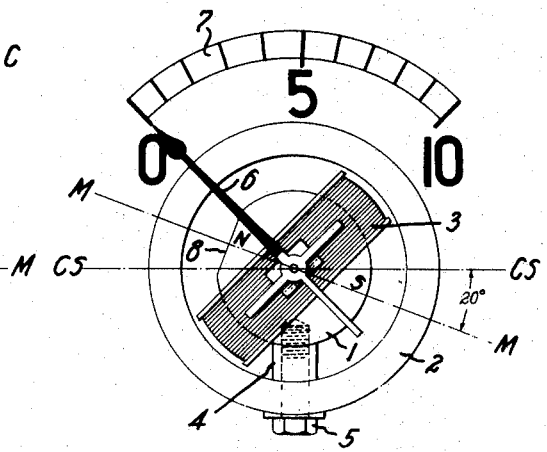
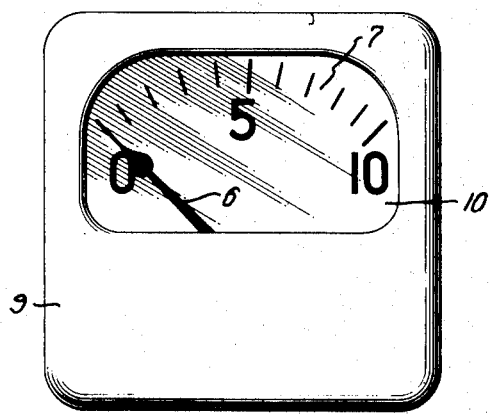
INVENTOR:-
Francis X. Lamb,
BY
Pierce, Scheffler & Parker,
Attorneys.

Patented Aug. 25, 1953

2,650,349

UNITED STATES PATENT OFFICE 2,650,349

ELECTRICAL INSTRUMENT WITH PERMANENT MAGNET CORE

Francis X. Lamb, East Orange, N. J., assignor to Weston Electrical Instrument Corporation, Newark, N. J., a corporation of New Jersey Application August 11, 1949, Serial No. 109,696

9 Claims. (Cl. 324—151)

This invention relates to electrical instruments of the permanent magnet, moving coil type, and more particularly to electrical instruments in which the magnetic field system includes a permanent magnet core and a soft iron yoke substantially coaxial with the core.

Instruments and instrument type relays may be constructed in small sizes when the core is the magnetized element of the field system but instruments with transversely magnetized cylindrical cores have a non-uniform scale which is particularly objectionable in the smaller instruments. It has been proposed to employ soft iron pole shoes on the magnetized core to overcome this scale distortion or non-uniformity, but this adds to the expense of manufacture and it is bad in principle since the length of the magnet is reduced materially, and this results in a considerable loss of magnetic strength at the air gap.

Objects of the present invention are to provide electrical instruments of the magnetic core type which afford an approximately uniform or linear scale without the use of soft iron pole shoes. An object is to provide electrical instruments in which the transversely magnetized core has a cross-section conforming substantially to that of a circle from which a small segment has been removed, the resulting planar surface being normal to the axis of magnetization of the core. More specifically, an object is to provide electrical instruments with magnetized cores of the stated non-circular cross-section in which the thickness of the core along its magnetic axis is about 95% of the diameter of the circular cross-section portion of the core, and the magnetic axis of the core is located about 20° above (as measured in the direction of up-scale movement of the coil) the center-scale position of the coil. Other objects are to provide magnetic field systems of the stated novel characteristics for incorporation in electrical instruments.

These and other objects and the advantages of the invention will be apparent from the following specification when taken with the accompanying drawings in which:

Figs. 1 and 2 are end elevations showing different arrangements of the essential coil and magnetic field systems of electrical instruments embodying the invention; and Fig. 3 is a front elevation, on an enlarged scale, of a miniature electrical instrument having a magnetic field system as shown in Fig. 2.

In the drawing, the reference numeral 1 identifies a transversely magnetized cylindrical core within a soft iron yoke 2 of annular cross-section which provides a return path for the magnet flux of the magnetized core and also serves as a magnetic shield for a coil 3 which extends around the core and is supported in conventional manner for pivotal movement. The core 1 is supported by and within the yoke 2 by any appropriate and desired means which may be, as illustrated, a spacing strip 4 at a region outside of the path of movement of the coil 3, and bolts 5 extending through the yoke 2 and strip 4, and threaded into the core 1.

A pointer 6 is secured to the coil 3 and is displaced thereby along a graduated scale 7. The angular displacement of the coil, and therefore the circumferential length of the graduated scale, is usually of the order of 90° in permanent magnet-moving coil instruments which do not include special magnetic systems and coil designs for obtaining a longer scale length. As illustrated, the coil displacement is 90°, and the central plane of the coil 3, indicated by broken line C—C, passes through the magnetic axis M—M of the core at the center-scale position of the coil, i. e. at zero scale position of the coil 3, the central plane C—C is 45° below or "down scale" from the magnetic axis M—M.

The bridges which support the jewel bearings and the restoring springs of the coil 3 are not shown in the drawing as the particular constructions of these elements form no part of the present invention. The apparatus as so far described is typical of magnetic core instruments and, when the core is a right circular cylinder coaxial with the yoke, the instrument scale is non-uniform with the graduation spacings decreasing progressively towards the upper end of the scale.

In accordance with the invention, the crowding of the graduations at the upper end of the scale is reduced materially by cutting back one of the arcuate polar surfaces of a core of cylindrical cross-section to provide a plane polar surface 8 normal to the magnetic axis M—M of the core. The degree of correction for non-uniformity of the scale varies with the depth of the cut and, as a presently preferred compromise between increasing scale uniformity and decrease in field strength, the cut is of such extent as to reduce the thickness of the core at the magnetic axis to about 95% of the diameter of the circular cross-section portion of the core. The spacing of the graduations of scale 7 in Fig. 1 is correct for the illustrated construction in which the cylindrical surfaces of the core 1 and yoke 2 are coaxial.

A closer approach towards a uniform scale is obtained with the magnetic field system illustrated in Fig. 2. The several elements of this form of the invention may be, and preferably are, identical with the corresponding elements of Fig. 1 and they are therefore identified by the same reference numerals but will not be described in detail. The novel feature of the Fig. 2 instrument is the clockwise rotation of the core 1 to locate its magnetic axis M—M up-scale from or above the broken line CS—CS which identifies the center-scale position of the coil. The scale divisions are not exactly uniform but the approximation to uniformity is usually satisfactory, and especially so in the case of small size instruments.

The Fig. 2 scale graduations are correct for the illustrated up-scale rotation of the magnetic axis M—M of core 1 by about 20°, but the invention is not limited to this particular displacement of the magnetic axis M—M of core 3 from the center scale position, line CS—CS, of the coil 3.

The magnetic cores of non-circular cross-section may be formed by grinding down a core of circular cross-section, or they may be formed to the desired cross-section by known powdered metallurgy processes. The cores are charged in the optimum direction, i. e. in the direction in which the molecules are oriented.

The invention is particularly useful in the "miniature instruments," as shown in Fig. 3, which as now manufactured commercially in the rectangular face type may measure only one inch along each side of the casing 9. The scale 7 is printed or marked on a scale plate 10 over which the pointer 6 is displaced by the moving coil, not shown. The particular scale graduations of Fig. 3 are for an instrument having a magnetic field system as shown in Fig. 2.

A closer approach to a scale of uniform graduations, and ultimately a strictly uniform scale, can be obtained by further modification of the non-circular cross-section of the cylindrical core of magnetized material; for example by rounding off the edges of the plane polar surface 8, or substituting a polar surface having a relatively long radius of curvature for the planar polar surface. It is to be understood that such expedients are contemplated by the invention but the particular advantage of the illustrated embodiments is that the instruments may be manufactured commercially at little or no more expense than the prior instruments with conventional cores and less satisfactory scales. The prior expedients of soft iron pole shoes on the permanent magnet core, and special shapings or eccentric locations of the magnet core and the soft iron yoke introduce complications which necessarily increase the manufacturing costs and usually increase the number of "rejects" which can not meet the final inspection at the factory. When the cores of non-circular cross-section are manufactured by a powdered metallurgy process, the manufacturing costs are actually somewhat less than for instruments with conventional cylindrical cores of circular cross-sections manufactured in the same way since less magnetic material is required. When the cores are made by grinding off a portion of a cylindrical core of initially circular cross-section, the cost increase is substantially less than that for applying soft iron pole shoes to the core, and the uniformity of manufacture within acceptable tolerances is increased.

It is to be understood that the invention is not limited to the particular embodiments herein shown and described since various changes which may occur to those familiar with the design and construction of electrical instruments fall within the spirit and scope of the invention as set forth in the following claims.

I claim:

1. An electrical measuring instrument of the type including a transversely magnetized cylindrical core, a soft iron yoke surrounding said core and spaced therefrom by a radial air gap, and a coil surrounding said core and pivotally supported for angular movement about an axis extending through said core; characterized by the fact that said core has diametrically arranged polar surfaces of different radii of curvature constituting portions of the inner wall of said air gap, and each of said polar surfaces is symmetrical with respect to a plane passed through the magnetic axis of the core.

2. An electrical instrument as recited in claim 1, wherein the magnetic axis of said core is positioned upscale from the center-scale position of said coil.

3. An electrical instrument as recited in claim 1, wherein said polar surface of shorter radius of curvature is that of a right circular cylinder coaxial with the axis of angular movement of said coil.

4. An electrical measuring instrument of the type including a transversely magnetized cylindrical core of magnetizable material, a soft iron yoke with an inner cylindrical wall of circular cross-section extending around and spaced radially from said core, and a moving coil extending around said core, characterized by the fact that a polar surface of said core is planar and substantially normal to the magnetic axis of the transversely magnetized cylindrical core.

5. An electrical measuring instrument as recited in claim 4, wherein the other polar surface of said core has the same center of curvature as the opposed inner cylindrical wall of the yoke, whereby the air gap between said other polar surface and the yoke is of constant radial length.

6. An electrical measuring instrument as recited in claim 4, wherein the magnetic axis of the transversely magnetized cylindrical core is positioned up-scale from the center-scale position of said coil.

7. An electrical measuring instrument as recited in claim 4, wherein the magnetic axis of the transversely magnetized cylindrical core is positioned up-scale by about 20° from the center-scale position of said coil.

8. An electrical measuring instrument as recited in claim 7, wherein said core has a transverse cross-section conforming to a circle with a portion thereof removed symmetrically with respect to the magnetic axis of said core to provide said polar surface, the thickness of the core along the magnetic axis being substantially 95% of the diameter of the core at circular cross-section region thereof.

9. For use in an electrical measuring instrument of permanent magnet-movable coil type, a transversely magnetized permanent magnet core of cylindrical form, said core having a plane polar surface normal to the magnetic axis of the core, and having a second polar surface of curved cylindrical form.

FRANCIS X. LAMB.

References Cited in the file of this patent

UNITED STATES PATENTS

| Number | Name | Date |
|---|---|---|
| 1,927,346 | Lawrence | Sept. 19, 1933 |
| 2,408,060 | Grace et al. | Sept. 24, 1926 |
| 2,509,893 | Taylor et al. | May 30, 1950 |
| 2,547,665 | Rowell | Apr. 3, 1951 |

FOREIGN PATENTS

| Number | Country | Date |
|---|---|---|
| 422,878 | Great Britain | Apr. 23, 1934 |
| 514,349 | Great Britain | Jan. 21, 1938 |